United States Patent
Bossan et al.

(10) Patent No.: US 11,435,279 B1
(45) Date of Patent: Sep. 6, 2022

(54) METHODS OF BONDING TWO AERONAUTICAL PARTS AND OF ANALYSING A BONDING BETWEEN TWO AERONAUTICAL PARTS

(71) Applicants: SAFRAN, Paris (FR); SAFRAN AIRCRAFT ENGINES, Paris (FR)

(72) Inventors: Pierre-Antoine Bossan, Moissy-Cramayel (FR); Thierry Patrick Chauvin, Moissy-Cramayel (FR); Lauren Chin, Moissy-Cramayel (FR); Cali Lapenta, Moissy-Cramayel (FR); Philippe Gallois, Moissy-Cramayel (FR)

(73) Assignees: SAFRAN, Paris (FR); SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/307,560

(22) Filed: May 4, 2021

(51) Int. Cl.
| | |
|---|---|
| *B32B 41/00* | (2006.01) |
| *G01N 15/08* | (2006.01) |
| *B64F 5/10* | (2017.01) |
| *C09J 5/02* | (2006.01) |
| *G06T 7/00* | (2017.01) |

(52) U.S. Cl.
CPC ............ *G01N 15/08* (2013.01); *B32B 41/00* (2013.01); *B64F 5/10* (2017.01); *C09J 5/02* (2013.01); *G06T 7/0004* (2013.01); *G01N 2015/0846* (2013.01); *G06T 2207/30136* (2013.01)

(58) Field of Classification Search
CPC ............ G01N 15/08; G01N 2015/0846; B32B 41/00; G06T 7/0004; G06T 2207/30136; B64F 5/10; C09J 5/02
USPC .................... 156/60, 64, 350, 351, 378, 379
See application file for complete search history.

(56) References Cited

U.S. PATENT DOCUMENTS

2010/0015455 A1\* 1/2010 Vontell .................. B29C 65/483
428/446

FOREIGN PATENT DOCUMENTS

| FR | 2956057 A1 | 8/2011 |
|---|---|---|
| FR | 3029134 A1 | 6/2016 |
| FR | 3051386 A1 | 11/2017 |

\* cited by examiner

*Primary Examiner* — Michael N Orlando
*Assistant Examiner* — Joshel Rivera
(74) *Attorney, Agent, or Firm* — Womble Bond Dickinson (US) LLP

(57) ABSTRACT

A method for analysing a bonding between two aeronautical parts. The method includes the steps of a) applying a release agent to a first surface to be bonded of a first part and to a second surface to be bonded of a second part, b) applying an adhesive to at least one of the first and second surfaces and positioning these surfaces on top of each other, the adhesive forming an adhesive film after polymerisation, c) separating the parts from each other and removing the adhesive film in one piece, d) analysing the adhesive film. The invention also relates to a method for bonding two aeronautical parts.

13 Claims, 6 Drawing Sheets

METHODS OF BONDING TWO AERONAUTICAL PARTS AND OF ANALYSING A BONDING BETWEEN TWO AERONAUTICAL PARTS

TECHNICAL FIELD

The present invention relates to a method of bonding two aeronautical parts and a method of analysing a bonding between two aeronautical parts.

BACKGROUND

The prior art comprises in particular the documents FR-A1-2 956 057, FR-A1-3 029 134 and FR-A1-3 051 386.

The use of composite materials is advantageous in the aeronautical industry in particular because these materials have interesting mechanical performances for relatively low masses.

One method for manufacturing a composite part for the aeronautics industry, which is well known to the person skilled in the art, is the RTM method (Resin Transfer Molding method).

This is a method for producing a part in composite material based on resin-impregnated fibres. Such a method is used, for example, to manufacture a turbomachine fan vane. A preform is realised and then heated so that the resin polymerises and forms the final part, for example a vane blade. This blade comprises a pressure side and a suction side extending from a leading edge to a trailing edge of the blade.

The composite material of the blade is relatively fragile, and in particular sensitive to impact, and it is known to be protected by means of a metal shield which is fitted and secured to the leading edge of the blade.

After polymerisation of the resin of the blade, the shield can be secured to the blade, for example with an epoxy adhesive. The complexity of the geometry of the parts can lead to difficulties in the pairing of the parts and affect the quality of the bonded assembly.

The bonded assembly can indeed present numerous anomalies linked, for example, to the presence of porosity or excess adhesive thickness. To check the quality of the bonded assembly, there are two different methods:
- the destructive control method, in particular by optical microscopy on a section. This method requires the cutting out of the area of the adhesive film that is to be analysed. The disadvantage of this method is that the analysis carried out is limited to the cut area and, above all, that the part is destroyed in order to carry out this analysis.
- the classic non-destructive control method, in particular the ultrasonic control. However, this method has its limitations in terms of characterising the adhesive films. For example, when the parts have highly variable geometries or strong material heterogeneities, which is the case for vanes, it is impossible to discern the effect induced by the parameters of the bonding method from that induced by the geometry of the parts.

The above two methods are costly and time-consuming and make it impossible to carry out large-scale tests when developing or industrialising a new bonding method. In addition, the quality of this bonding analysis is limited. As a result, the bonding always contain numerous anomalies.

The invention aims to improve at least one of the above problems.

SUMMARY OF THE INVENTION

To this end, the invention proposes a method for analysing a bonding between two aeronautical parts, characterised in that it comprises the steps of:
a) applying a first release agent to a first surface to be bonded of a first part and a second release agent to a second surface to be bonded of a second part,
b) applying an adhesive to at least one of the first and second agents and positioning the first and second parts on top of each other so that the adhesive is located between the first and second agents, the adhesive forming an adhesive film after polymerisation,
c) separating the parts from each other and removing the adhesive film in one piece,
d) analysing the adhesive film.

The invention thus allows to remove the adhesive film in one piece, enabling to analyse the entire useful area of the bonding in a real situation. It also allows the two parts to be kept intact after separation, which allows to repeat the test several times in a short time.

The parameters related to the geometry of the part are then identical for all tests performed on a same pair of parts.

As the parameters linked to the geometry of the parts are fixed, it is possible to discern only the effect of the parameters of the bonding method in the repeated analysis and thus to eliminate the root cause of the anomalies of the bonding. It is then possible to adjust the parameters of the bonding method to improve it.

In particular, this analysing method is more economical than the current destructive techniques and more accurate than the current non-destructive techniques.

The method of the invention is therefore non-destructive, allows the analysis of the adhesive film without the creation of artifacts and is insensitive to the geometric variations of the parts studied.

The method according to the invention may comprise one or more of the following characteristics, taken alone with each other or in combination with each other:
- the step a) is preceded by a step of applying a pore-sealing agent to the first surface to be bonded, of the first part, and to the second surface to be bonded, of the second part.
- the step d) is carried out by analysing at least one image obtained by transparency of the adhesive film to a light.
- the analysis of the image comprises the comparison and the interpretation of the differences in colour or contrast.
- the analysis of the image comprises the evaluation of the thickness of the adhesive film in one or more areas of the image.
- the analysis of the image comprises the evaluation of the porosity rate of the adhesive film.
- the first part is metallic.
- the second part is made of a composite material and comprises, for example, carbon fibres embedded in a polymeric matrix.
- the second part is a vane or a blade and the first part is a shield for reinforcing a leading edge of this vane or blade.

The present invention also relates to a method for bonding two aeronautical parts, characterised in that it comprises the steps of the method as described above, followed by the steps of: e) applying an adhesive to at least one of the first and second surfaces and positioning these surfaces on top of each other, the adhesive forming an adhesive film after polymerisation.

The bonding method further comprises, between the steps d) and e), a step of cleaning and/or preparing the first surface of the first part and the second surface of the second part.

BRIEF DESCRIPTION OF FIGURES

Further characteristics and advantages of the invention will become apparent from the following detailed description, for the understanding of which reference is made to the attached drawings in which.

DETAILED DESCRIPTION OF THE INVENTION

Figure 1:
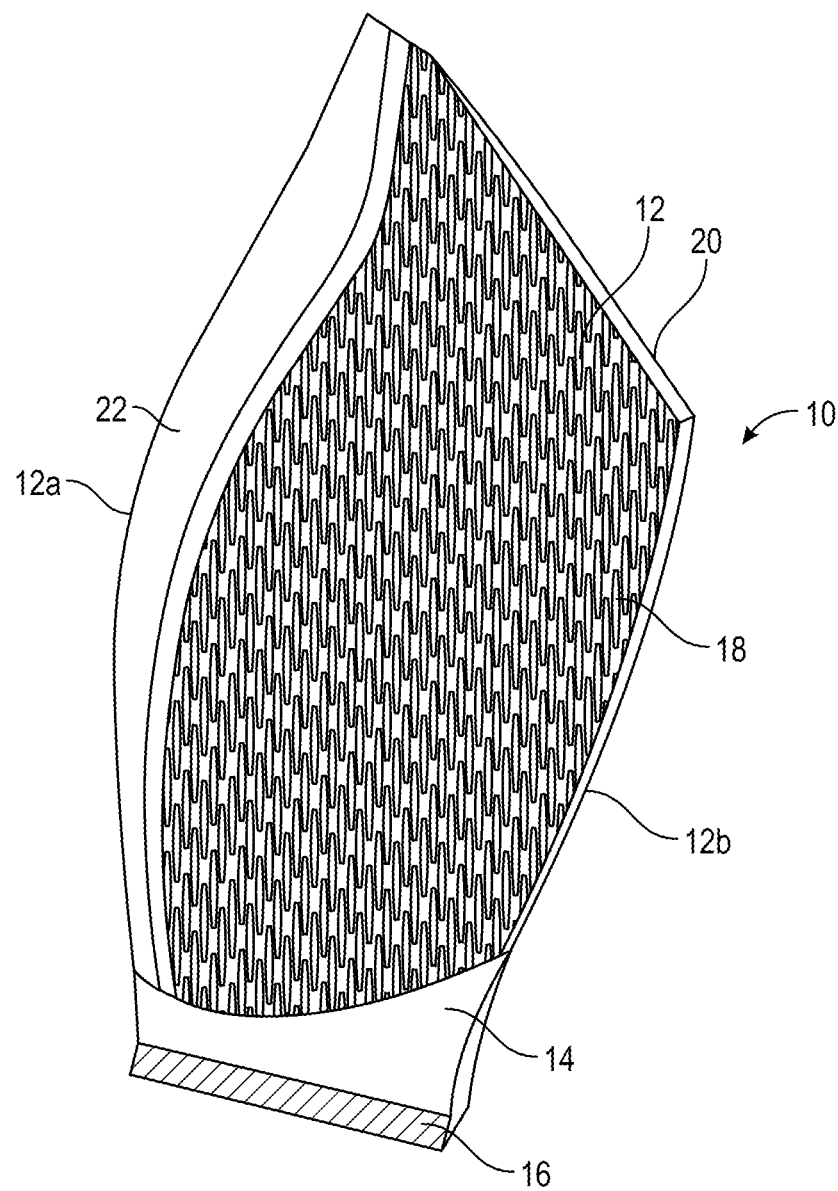
FIG. 1 is a schematic perspective view of an aircraft turbomachine composite vane.

Reference is first made to FIG. 1 which illustrates a composite material vane 10 for a turbomachine, this vane 10 being for example a fan vane.

The vane 10 comprises a blade 12 connected by a stilt 14 to a root 16 which has, for example, a dovetail shape and is shaped to be engaged in a complementarily shaped pocket of a rotor disc, in order to retain the vane on this disc.

The blade 12 comprises a leading edge 12a and a trailing edge 12b for gases flowing into the turbomachine. The blade 12 has a curved or twisted aerodynamic profile and comprises a pressure side 20 and a suction side 18 extending between the leading edge 12a and trailing edge 12b.

The blade 12 is made from a fibrous preform obtained by three-dimensional fibres weaving, for example carbon.

The leading edge 12a of the blade is reinforced and protected by a shield 22, in particular metallic, for reinforcing the leading edge 12a and which is fixed to the latter. The shield 22 is for example made of a titanium-based alloy.

This fixing is carried out in particular by bonding, forming an adhesive film after polymerisation, between the blade 12 and the shield 22.

Figure 2:
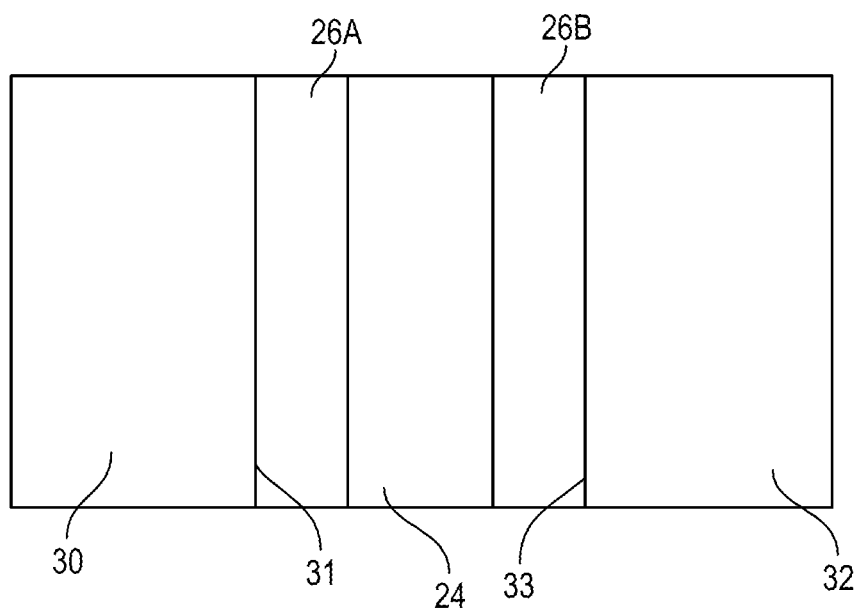
FIG. 2 is a schematic diagram of a bonding according to the invention.

As can be seen in FIG. 2, the invention concerns a method for analysing the bonding between a first part 30, for example the metal shield 22, and a second part 32, for example the vane 10 or the blade 12, made of a composite material and comprising, in particular, carbon fibres embedded in a polymeric matrix. In order to allow the analysis of this adhesive film 24, the invention proposes to obtain the adhesive film 24 in one piece by following the steps a), b) and c).

The step a) consists of applying a first release agent 26A, to a first surface 31 to be bonded of the first part 30, and a second release agent 26B to a second surface 33 to be bonded of the second part 32.

The step a) is for example preceded by a step of applying a pore-sealing agent to the first and second surfaces 31, 33.

The step b) then consists of applying an adhesive to at least the first or the second release agent 26A, 26B, and positioning the first and second parts 30, 32 on top of each other so that the adhesive is located between the first and the second release agents 26A, 26B, the adhesive forming an adhesive film or seal 24 after polymerisation. This bonding step of the analysing method, comprising the presence of the first and second release agents 26A, 26B, is carried out under conditions almost similar to the conventional bonding method during the production of a vane. During this bonding step, certain parameters, such as the pressure or the flow rate of the adhesive, are known and can be adjusted.

Figure 3:
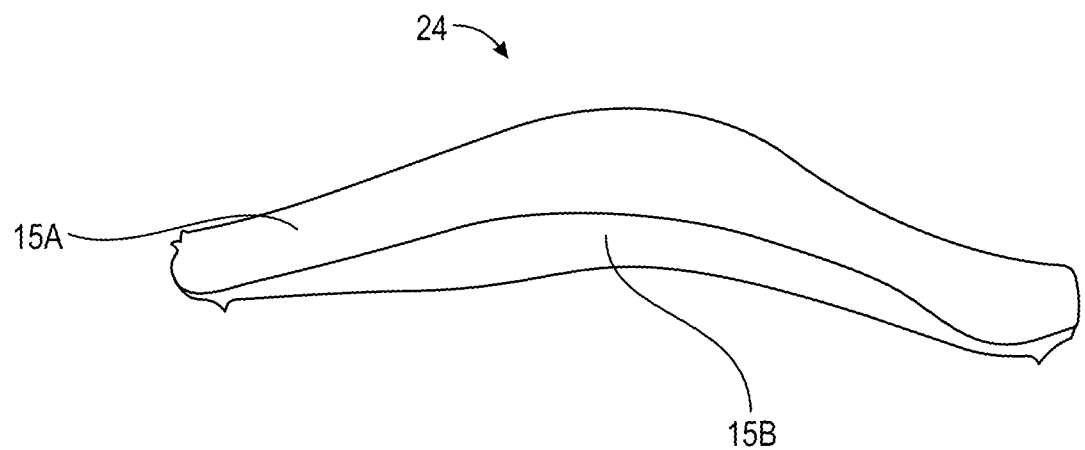
FIG. 3 is a schematic perspective view of an adhesive film after separating it from the vane and a shield.

During the next step c), it is possible to separate the first and second parts 30, 32, from each other and remove the adhesive film 24 in one piece, as shown in FIG. 3, due to the first and second release agents 26A, 26B.

It is then possible to proceed to the next step d) of the method, which consists of analysing the adhesive film 24, in particular in order to inspect the quality of the adhesive film 24 over the entire useful surface of the bonding.

Figure 4A:
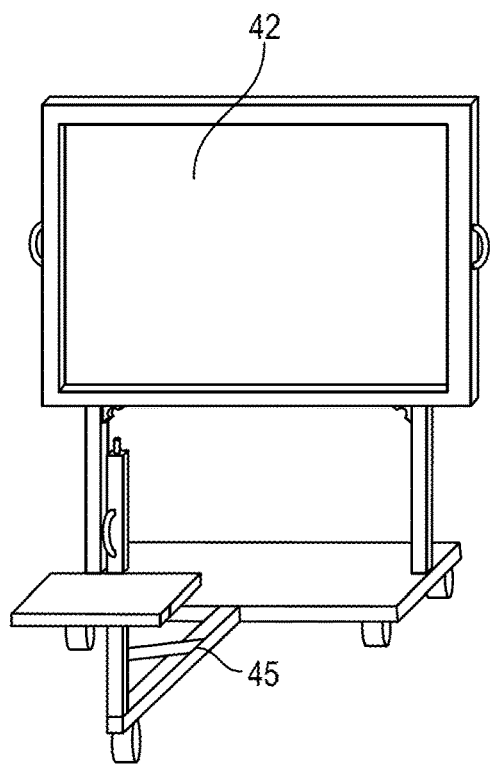
FIGS. 4a, 4b, 4c is a schematic view of a method for analysing a bonding by digitising an image obtained by transparency of the adhesive film to a light.
Figure 4B:
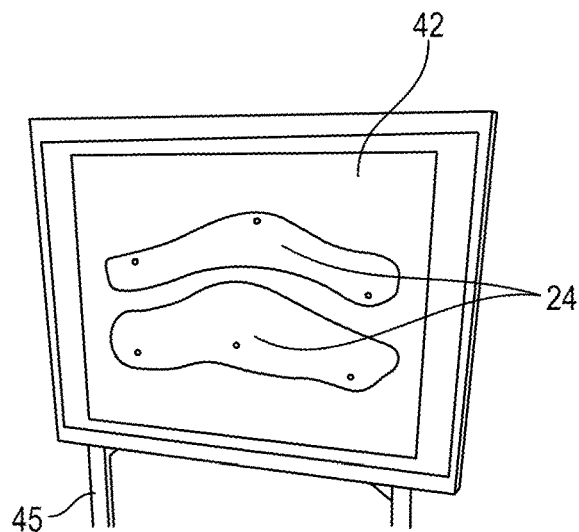
Figure 4C:
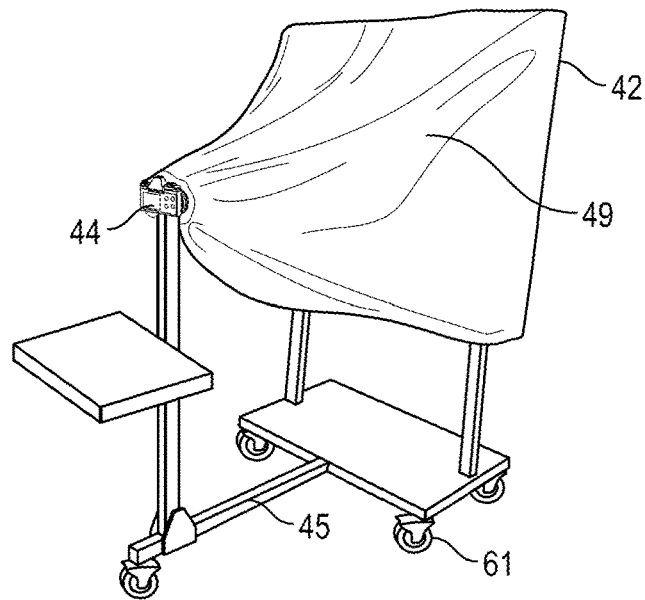

For the analysis of the adhesive film 24 and as illustrated in FIGS. 4a, 4b and 4c, the invention provides the placement of the adhesive film 24 on a light screen 42. The light is thus transmitted through the adhesive film 24 by transparency, giving variations in contrast, of grey level and/or of colour which are related to variations in the thickness of the adhesive film 24 and therefore variations in the transmission of the light.

The method then provides an acquisition of a digital image of the illuminated adhesive film 24, in particular by means of a digital camera 44, placed at a precise location, in particular on a frame 45, in particular a fixed frame. The light screen 42 may also be located on the frame 45. Thus, the assembly of the light screen 42, the digital camera 44 and the frame 45 forms a fixed unit in particular for the purpose of improving the quality of the images and the analysis. Alternatively, the digital camera 44 is placed at a specific location marked on the floor by a marker fixed relative to the light screen 42.

The frame 45 can, for example, be mounted on wheels 61. In particular, the frame 45 comprises a tarp 49 covering the digital camera 44 and the light screen 42 in particular for the purpose of improving the quality of the image and the analysis.

Figure 5A:
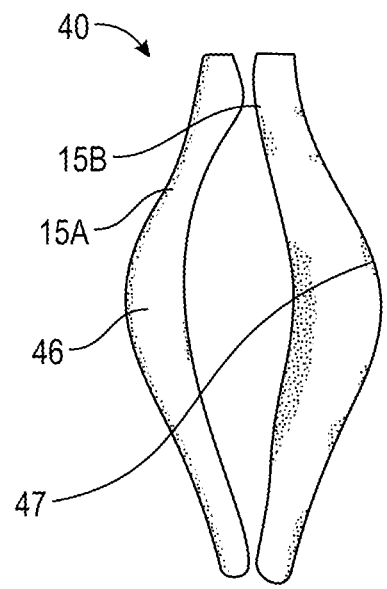
FIGS. 5a and 5b are schematic views of digitised images of two adhesive films.
Figure 5B:
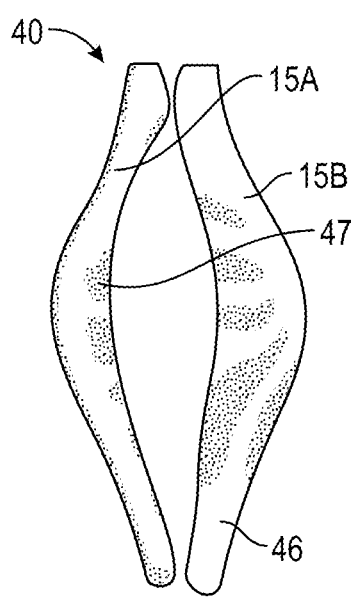

This digitisation is illustrated schematically in FIGS. 5a and 5b, in which the images 40 of two adhesive films 24, on the suction side 15A and pressure side 15B sides, were obtained by two different methods. The first method, shown in FIG. 5a, consists of the assembly of a vane with a shield. The second method, shown in FIG. 5b, consists of the assembly of the same vane but with a different shield.

The image can then be analysed by computer to compare and interpret differences in colour or contrast in order to evaluate the thickness on the entire adhesive film 24. Thus a specific application has been developed to allow a correlation between the grey level recorded on the image 40 of adhesive film and the thickness of the adhesive film.

This correlation or reference chart between the grey level and the thickness was found empirically by following the following steps:
  marking of different areas on the adhesive film 24, in
    particular seven areas. In particular, the marking is
    made by a circle with a black marker and ensures that
    the areas on the adhesive film 24 are precisely marked and visible in the digital image 40. The seven selected areas will be approximately identical on all the samples of adhesive films 24.

measuring physically the thickness of the adhesive film 24 at the seven areas previously marked with a marker. The measuring instrument allows measurements with micrometre precision or any other means capable of measurement.

filtering the grey values in the digital image to obtain a coloured stain, for example a fire grayscale filtering. More precisely, between a black pixel with a value of 0 and a white pixel with a value of 255, the intermediate values will stain the pixels blue, red, orange and yellow.

recording the grey level, i.e. the stain values of the pixels in the digital image in the seven areas marked beforehand with the marker, visible in the image. The size of the area to be recorded can be, for example, from 25 to 50 pixels.

creating a graph with the grey values and the physically measured thickness for the seven areas in order to obtain a correlation curve between the grey values and the thickness of the adhesive film 24.

This experiment is carried out for both sides of the adhesive film 24, i.e. the suction side 15A and the pressure side 153, and for each method, in particular the method shown in FIG. 5a and the method shown in FIG. 5b.

Figure 6:
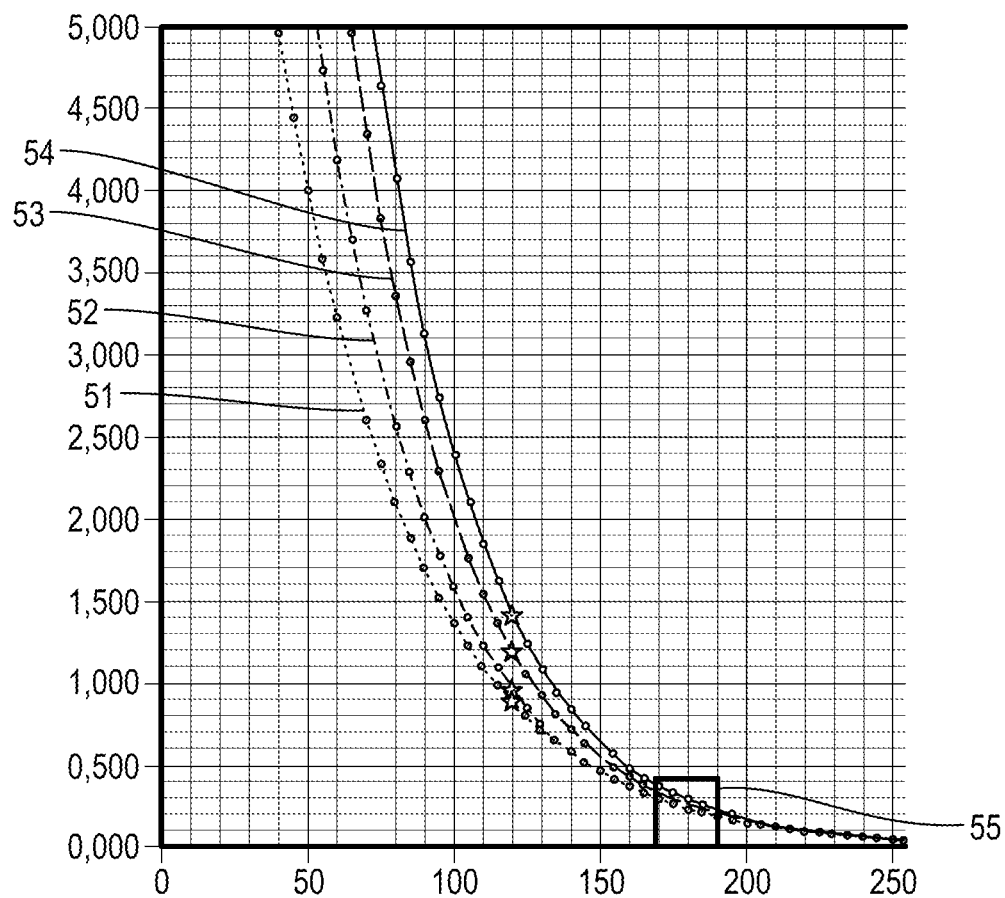
FIG. 6 is a correlation graph between grey levels present in the image and the thickness of the adhesive film.

As shown in FIG. 6, the graph shows the grey values, from 0 to 255, on the abscissa and the thicknesses of the adhesive film 24 in millimetres on the ordinate. A different curve is drawn for each method used and for each side (pressure side and suction side) of the adhesive film. The curve is plotted from points whose abscissa corresponds to the average grey value of the pixels on an area of the adhesive film 24, and therefore the ordinate corresponds to the measurement in millimetres of the thickness of this same area of the adhesive film 24.

On the graph, the curve 51 represents the values obtained on the pressure side with the method shown in FIG. 5a, the curve 52 represents the values obtained on the suction side with the method shown in FIG. 5a, the curve 53 represents the values obtained on the suction side with the method shown in FIG. 5b and the curve 54 represents the values obtained on the pressure side with the method shown in FIG. 5b.

With these four curves, it is possible to evaluate the thickness of the adhesive film 24 at any point using the grey level of the pixels of the digital image 40.

The thickness of the adhesive film 24 must be between 30 and 400 µm and in particular less than 350 microns. Thus, the grey level must be within the area of the graph referenced 55, i.e., the grey level must be between 170 and 190.

Returning to the examples shown in FIGS. 5a and 5b, an area having a light colour referenced 46, corresponds to a low thickness of the adhesive film 24. An area with a dark colour referenced 47, in particular illustrated with dots, corresponds to a large thickness of the adhesive film 24. For clarity, FIGS. 5a and 5b show only two distinct areas, light 46 and dark 47, but the images 40 actually comprise a gradation of grey level and/or colour as explained above.

Figure 7:
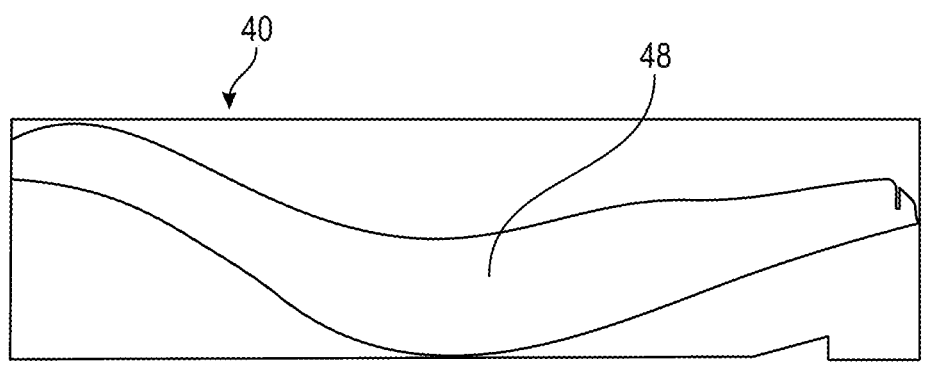
FIG. 7 is a schematic view of an image of an adhesive film for identifying the porosities.

The image analysis also allows the evaluation of the porosity rate of the adhesive film 24 on the pressure side and the suction side, as shown in FIG. 7. In order to obtain this image, the digital images 40 of the adhesive films 24 are processed, in particular by following the following method: assembling, converting to 8-bit grey level, uniformizing the background, bandpass filtering, inversing the grey level, trimming the area of interest, thresholding in black and white and binning. The porosities are thus represented by areas of black pixels on a white background. These areas of porosity 48 can be counted, their calculated area thus allowing comparisons to be made between different adhesive films 24 whose bonding parameters, such as the pressure applied to the film or the flow rate of the adhesive, are different with the aim of reducing the porosity rate. The comparison of the porosity rate also allows the bonding method to be improved.

The analysing method of the invention can be repeated several times in a row between the same first and second parts 30, 32 but varying the bonding parameters such as the pressure applied to the film or the adhesive flow rate in order to study the effect of the parameters on the quality of the bonding and in particular on the thickness and the porosity rate of the adhesive film. The interpretation and the comparison of the different thicknesses and porosity rates will allow the optimization of the bonding parameter settings in order to carry out a method of bonding between two aeronautical parts, such as a shield and a vane, of improved quality.

The invention further relates to such a bonding method comprising the preceding steps of the analysing method, followed by the steps of:

e) applying an adhesive to at least one of the first and second surfaces 31, 33, and positioning these surfaces on top of each other, the adhesive forming an adhesive film 24 after polymerisation.

Thus, thanks to the invention and in particular to the prior analysis of the adhesive film, the parameters of the bonding method are optimised, so that the bonding is optimised in particular with regard to the thickness of the adhesive film and its porosity.

The bonding method of the invention further comprises, between the steps d) and e), a step of cleaning, for example release residues, and/or of preparing the first and second surfaces 31, 33, mentioned above.

The invention can be applied in general to the aeronautical industry as well as to any industry producing composite material or metallic parts requiring a bonding operation, but also to any industry producing opaque polymers requiring a control of the thickness, the porosity or inclusion rate.

The invention claimed is:

1. A method for analysing a bonding between two aeronautical parts, wherein the method comprises the steps of:
    i) applying a first pore-sealing agent to a first surface to be bonded of a first part and a second pore-sealing agent to a second surface to be bonded of a second part,
    a) applying a first release agent to said first pore-sealing agent and a second release agent to said second pore-sealing agent,
    b) applying an adhesive to at least one of the first and second release agents and positioning the first and second parts on top of each other so that the adhesive is located between the first and the second release agents, the adhesive forming an adhesive film after polymerisation,
    c) separating the parts from each other and removing the adhesive film in one piece,
    d) analysing the adhesive film.

2. The method according to claim 1, wherein the step d) is carried out by analysing at least one image obtained by transparency of the adhesive film to light.

3. The method according to claim 2, wherein the analysis of the image comprises the comparison and the interpretation of the differences in colour or contrast.

4. The method according to claim 3, wherein the analysis of the image comprises the evaluation of the thickness of the adhesive film in one or more areas of the image.

5. The method according to claim 3, wherein the analysis of the image comprises the evaluation of the porosity rate of the adhesive film.

6. The method according to claim 1, wherein the first part is metallic.

7. The method according to claim 1, wherein the second part is made of composite material.

8. The method according to claim 1, wherein the second part is a vane or a blade and the first part is a shield for reinforcing a leading edge of said vane or blade.

9. A method for bonding two aeronautical parts, wherein said method comprises the steps of the method according to claim 1, followed by the steps of:
   e) applying an adhesive to at least one of the first and second surfaces and positioning these surfaces on top of each other, the adhesive forming an adhesive film after polymerisation.

10. The method according to claim 1, wherein said method comprises, between the steps d) and e), a step of cleaning and/or preparing said first and second surfaces.

11. The method according to claim 7, wherein the second part comprises carbon fibres embedded in a polymeric matrix.

12. The method according to claim 1, wherein said first pore-sealing agent seals pores of said first surface, and said second pore-sealing agent seals pores of said second surface.

13. The method according to claim 7, wherein said first release agent covers said first pore-sealing agent, and said second release agent covers said second pore-sealing agent.

* * * * *